United States Patent [19]
Barnea

[11] Patent Number: 5,771,066
[45] Date of Patent: Jun. 23, 1998

[54] THREE DIMENSIONAL DISPLAY DEVICE

[76] Inventor: Daniel I. Barnea, 77 Gordon, Tel Aviv, Israel

[21] Appl. No.: 778,591

[22] Filed: Jan. 3, 1997

[51] Int. Cl.$^6$ .................................................. H04N 13/04
[52] U.S. Cl. ................................. 348/59; 348/54; 348/55
[58] Field of Search ................................. 348/54, 55, 59; H04N 13/04

[56] References Cited

U.S. PATENT DOCUMENTS 5,132,839  7/1992  Travis ...................................... 359/462
5,218,387  6/1993  Ueno ....................................... 351/209
5,481,622  1/1996  Gerhardt ................................. 382/103

*Primary Examiner*—Howard W. Britton
*Attorney, Agent, or Firm*—Mark M. Friedman

[57] ABSTRACT

An improved three dimensional display device, for a single viewer. To the apparatus of U.S. Pat. No. 5,132,839 is added a mechanism for tracking the eye motion of the viewer. Because the control system "knows" the angles at which the device must project the frame images, only two (stereoscopic) frame images need to be projected in each frame, and a more complete illusion of three dimensionality, with respect to both lateral and vertical movement of the viewer, is provided.

18 Claims, 2 Drawing Sheets

THREE DIMENSIONAL DISPLAY DEVICE

FIELD AND BACKGROUND OF THE INVENTION

The present invention relates to a three dimensional display apparatus and, more particularly, to a three dimensional video display whereon a three dimensional moving image is seen without visual aids.

Travis, in U.S. Pat. No. 5,132,939, which is incorporated by reference for all purposes as if fully set forth herein, teaches one such display. The Travis apparatus comprises a backlighting apparatus for projecting beams of light in selected directions, a spatial light modulator for displaying images back-lit by the backlighting apparatus, and a control system coupled to both the spatial light modulator and the backlighting apparatus. The control system causes a plurality of images of an object to be formed in succession on the spatial light modulator, with each image being viewable only from particular angles. The images are formed one at a time on the spatial light modulator, with a plurality of images constituting a single frame of a video picture.

In one embodiment of the Travis apparatus, the backlighting apparatus includes a two dimensional display device, such as a CRT, for emitting spots of light at selected locations along the two dimensional display, and a lens system for refracting the light emitted by the two dimensional display. The lens system is located between the two dimensional display and the spatial light modulator, which typically is a liquid crystal display (LCD). The lens system refracts beams emerging from a spot of light on the CRT into substantially parallel rays.

The number of images displayed per frame is selected so that a viewer at a convenient distance from the apparatus sees one image with his/her left eye and a different image with his/her right eye. A typical number of images is between 8 and 12. The images are selected to give the viewer an illusion of parallax. As the user moves laterally, different images come into the fields of view of the user's eye, so that the apparatus can provide an illusion of seeing around objects to a limited extent.

This embodiment of the Travis apparatus suffers from certain limitations. The first limitation is related to the fact that multiple images must be formed on the spatial light modulator, and all must be illuminated successively within the time of a typical video frame, about $\frac{1}{30}$ of a second. With N images displayed, the light source of the backlighting apparatus must be N times as intense as conventional video light sources. It has been found that CRT's of special design are needed for this application.

The second limitation is related to the fact that discrete images are projected in different spatial directions. If one or both of a user's eyes are positioned at the border between two projection zones, the user may perceive the boundary between the two zones, with a consequent loss of realism. This limitation can be minimized by providing more images and more zones, at the expense of having to provide a yet more intense light source for the backlighting apparatus.

The third limitation is related to the fact that the images are parallax images, and not true three dimensional images. The user is provided with an illusion of three dimensionality of the user moves his/her head laterally, but not if the user moves his/her head vertically. It has been found that vertical head motion produces the impression that the image is moving vertically, too, in the same direction, instead of remaining fixed in space. It goes without saying that the illusion of seeing over or under an object cannot be provided by this embodiment of the Travis apparatus.

There is thus a widely recognized need for, and it would be highly advantageous to have, an improved three dimensional display device, based on the Travis apparatus, that allows the use of less intense and less costly light sources for backlighting and that provides a more complete illusion of three dimensionality.

SUMMARY OF THE INVENTION

According to the present invention there is provided an apparatus for displaying, to the eyes in the face of a single viewer, each of the eyes having a position, a subject in a motion picture having a plurality of frames, the apparatus comprising: (a) a back-lighting mechanism for projecting a beam of light in selected directions; (b) a spatial light modulator for displaying frame images, the back-lighting mechanism acting as a back-light for the spatial light modulator; (c) a tracking mechanism for tracking the positions of the eyes of the viewer; and (d) a control system coupled to and controlling the back-lighting mechanism, coupled to and controlling the spatial light modulator, and coupled to and controlling the tracking mechanism, for causing two different frame images of the subject to be formed in succession on the spatial light modulator, each different frame image being a view of the subject from a different angle, each different frame image being formed one at a time on the spatial light modulator, with the two frame images constituting a single frame of the motion picture, and the direction of the beam of light being different for each of the two different frame images in accordance with the positions of the eyes of the viewer.

The present invention solves the limitations listed above in the special case that the display device is viewed by a single viewer. This is an important special case, for example in arcade game applications. The improvement of the present invention over the Travis apparatus lies in the provision of a mechanism for tracking the motion of the pupils of the viewer's eyes, relative to a frame of reference such as the spatial light modulator or the room within which the apparatus is housed. This tracking may be done directly, or indirectly by tracking the head or face of the viewer and inferring the positions of the viewer's eyes. Because the apparatus "knows" where the viewer's eyes are, the two dimensional display device of the backlighting apparatus needs to emit only two spots of light, or only two sets of spots of light, depending on the specific embodiment, and therefore requires only 2/N of the intensity of an N-image Travis apparatus. Conventional CRTs are adequate for this application. Correspondingly, only two images per frame need to be formed on the spatial light modulator, and the boundary between the projection zones of the two frame images is adjusted in real time to be between the viewer's eyes, preserving the illusion of three dimensionality at all lateral positions. Furthermore, the frame images are adjusted in real time to match the vertical movement of the user's eyes and head, preserving the illusion of three dimensionality at all vertical positions, despite the fact that, strictly speaking, each of the two frame images is a stereoscopic image. Preferably, the tracking mechanism predicts the motion of the user's eyes about half a frame ($\frac{1}{60}$ of a second) in advance, for more efficient real-time generation of new frame images.

Although the focus of the present invention is on the particular embodiment of the Travis apparatus described above, it will be appreciated that the scope of the invention includes the corresponding improvement of all embodiments of the Travis apparatus and similar apparati that display to each eye a separate computed image.

BRIEF DESCRIPTION OF THE DRAWINGS

The invention is herein described, by way of example only, with reference to the accompanying drawings, wherein.

DESCRIPTION OF THE PREFERRED EMBODIMENTS

The present invention is of a display device that provides a single user with a more complete illusion of three dimensionality, without visual aids, than previously known devices.

The principles and operation of a three dimensional display device according to the present invention may be better understood with reference to the drawings and the accompanying description.

Figure 1:
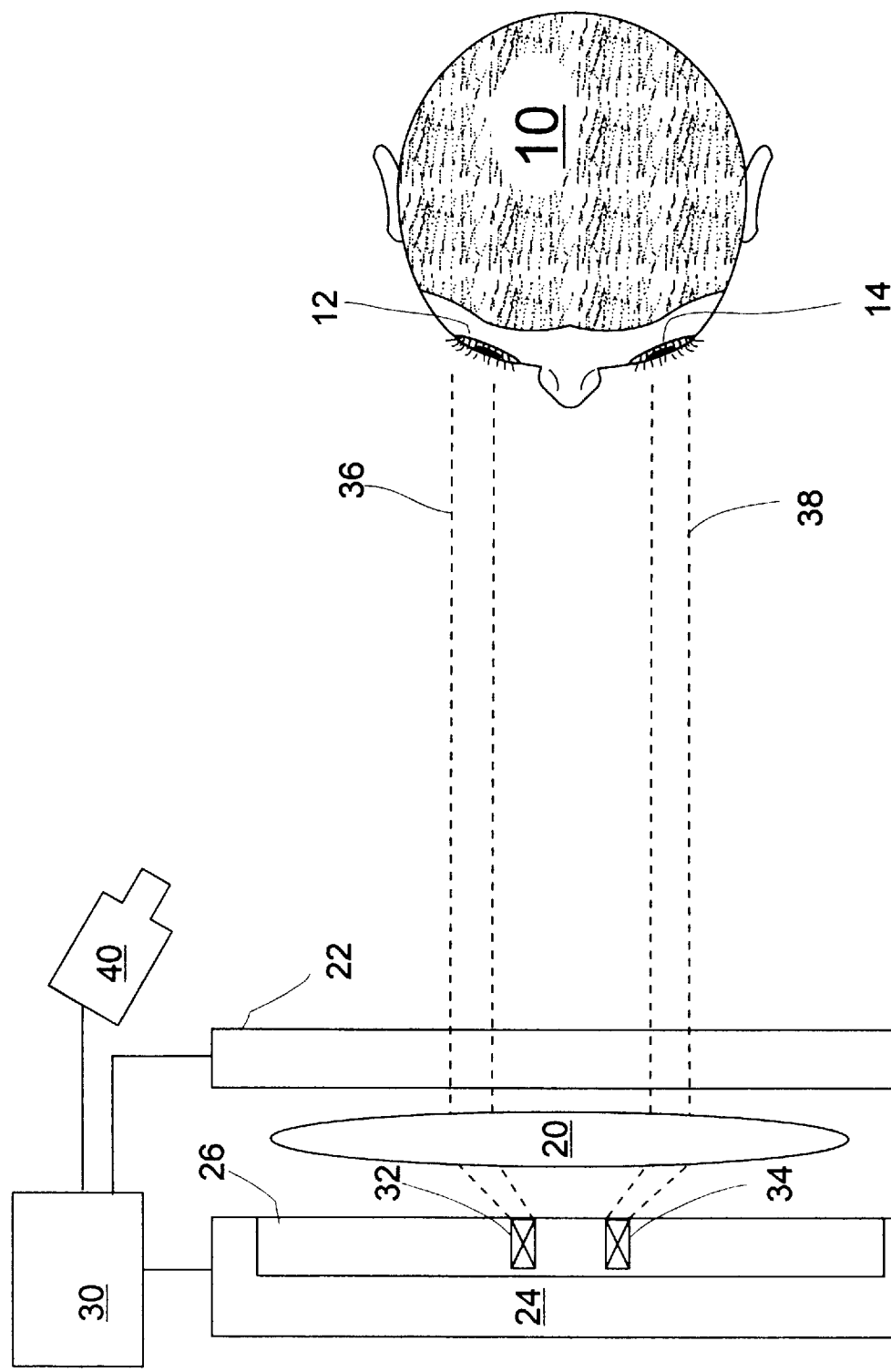
FIG. 1 is a schematic diagram of one embodiment of the present invention.

Referring now to the drawings, FIG. 1 is a schematic diagram of a first embodiment of the present invention, corresponding to an improved version of the embodiment of the apparatus illustrated in FIGS. 1, 2a and 2b of the Travis patent. The Travis apparatus comprises a lens 20, a spatial light modulator 22, a two dimensional display device 24 having a screen 26, and a control system 30. To these components, the present invention adds a tracking system, in the form of a video camera 40. With the apparatus of FIG. 1, a succession of two dimensional frame images (pictures) representing views of a three dimensional object from two different angles (directions) are displayed by spatial light modulator 22. Simultaneous to the display of the picture, two spots of light 32 and 34 are alternately provided on screen 26 of two dimensional display device 24. During one half of a frame, when light from spot 32 passes through lens 20, it is converted into substantially parallel rays of light 36 whose direction depends on the position of spot 32 in screen 26 of two dimensional display device 24. Similarly, during the other half of a frame, when light from spot 34 passes through lens 20, it is converted into substantially parallel rays of light 38 whose direction depends on the position of spot 34 in screen 26 of two dimensional display device 24. Video camera 40 acquires tracking images of the face of viewer 10. Control system 30 analyzes the tracking images acquired by video camera 40 to determine the positions of the pupils of eyes 12 and 14 of viewer 10. The position of spot 32 is so controlled by controller 30 that light passes through spatial light modulator 22 only to eye 12, and through a portion of spatial light modulator 22 upon which is displayed the frame image of the three dimensional object that is to be received by eye 12, i.e., the image of the three dimensional object as it would be seen, if actually present, from the vantage point of eye 12. Similarly, the position of spot 34 is so controlled by controller 30 that light passes through spatial light modulator 22 only to eye 14, and through a portion of spatial light modulator 22 upon which is displayed the frame image of the three dimensional object that is to be received by eye 14.

Control system 30 analyzes the tracking images using pattern recognition algorithms that are well-known in the art, to identify and locate the pupils of eyes 12 and 14. Control system 30 then performs standard geometric ray tracing calculations to determine on which portion of spatial light modulator 22 the two frame images of the three dimensional object must be displayed, and the corresponding portions of screen 26 that must be illuminated to provide spots 32 and 34. In addition to detecting the lateral position of the pupils of eyes 12 and 14, control system 30 detects the elevation of the pupils, thereby determining the elevation angle from which viewer 10 observes the frame images, and adjusts the frame images accordingly to give viewer 10 the illusion of looking over or under the three dimensional object. Preferably, control system 30 also exploits well-known signal processing techniques to predict the future positions of the pupils of eyes 12 and 14 half a frame ahead, so that the images to be displayed in the next frame may be computed in advance. This prediction is facilitated by the fact that a human viewer moves only slightly in the 1/60 of a second corresponding to half a video frame.

It will be appreciated that, like the apparatus of the Travis patent, the apparatus of the present invention can be used to display three dimensional color images. To obtain color, each view comprises a red, a blue and a green picture. The pictures are presented successively as the two images on spatial light modulator 22, and the color of the light from spots 32 and 34 is varied as appropriate for the picture. For example, during the first 1/6 of a frame, an image to be perceived by eye 12 in red light is displayed by spatial light modulator 22 and illuminated by red light from spot 32; during the second 1/6 of a frame, an image to be perceived by eye 14 in red light is displayed by spatial light modulator 22 and illuminated by red light from spot 34; and so on for images illuminated by green light during the middle 1/3 of the frame and by blue light during the last 1/3 of the frame. The red-green-blue color encoding scheme is used herein only as an example; any equivalent coding scheme, such as cyan-magenta-yellow, may be used instead.

Alternatively, colored filters may be placed over pixel positions on spatial light modulator 20 and two dimensional display device 24 made to emit white light. The three pictures are presented simultaneously on spatial light modulator 20 so that the pixels of each picture are displayed at a pixel position covered in a filter of the appropriate color.

Figure 2:
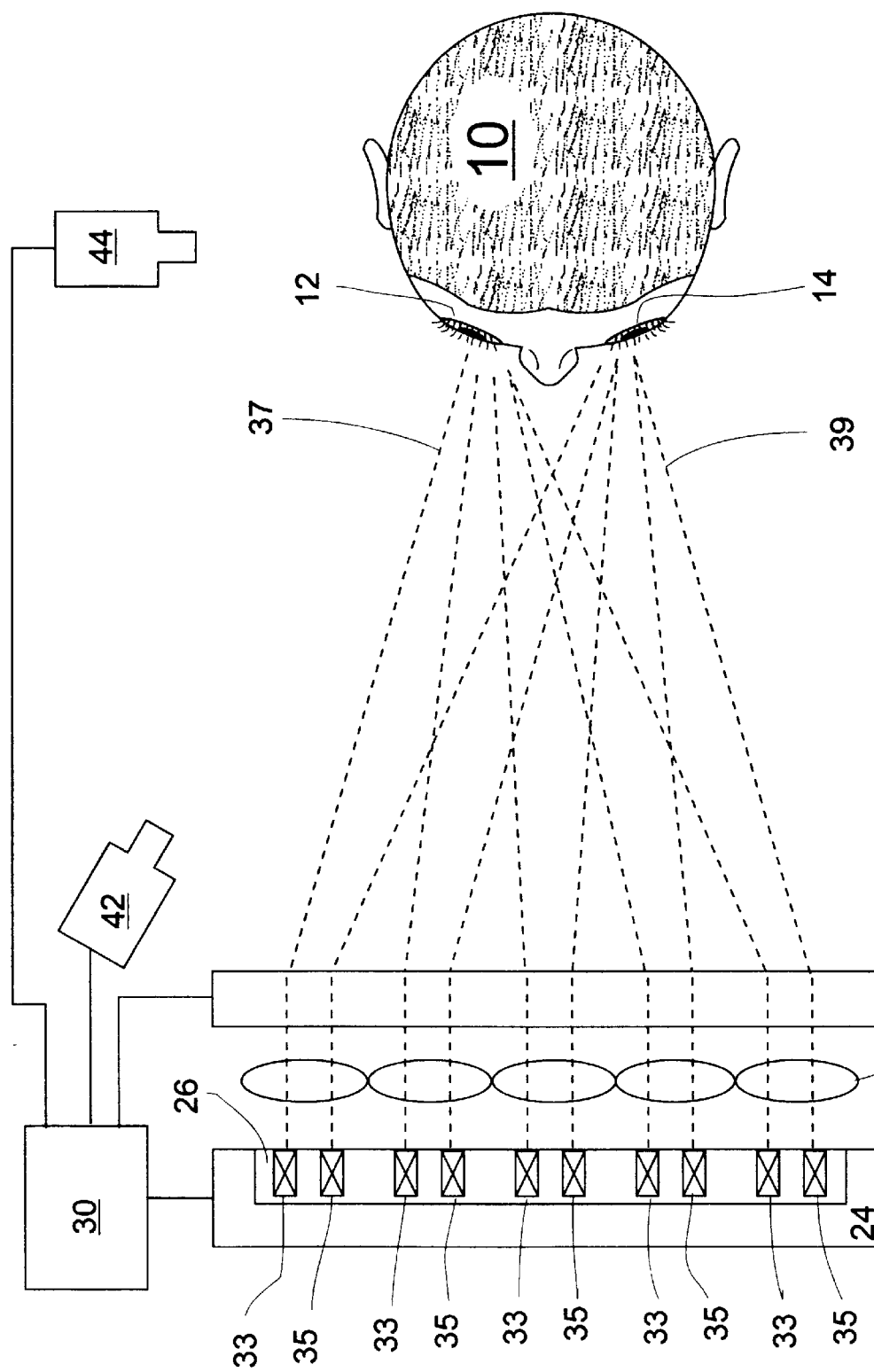
FIG. 2 is a schematic diagram of a second embodiment of the present invention.

FIG. 2 is a schematic diagram of a second embodiment of the present invention, corresponding to an improved version of the embodiment of the apparatus illustrated in FIGS. 4 and 5 of the Travis patent. This apparatus is generally similar to the apparatus of FIG. 1, except that lens 20 has been replaced by a lenticular array 21. Screen 26 is placed in the focal plane of the lenses of lenticular array 21. Because the lenses of lenticular array 21 are smaller than lens 20, screen 26 is located closer to the lenses. Thus, the thickness of the three dimensional display of FIG. 2 is significantly thinner than that of FIG. 1.

With the apparatus of FIG. 2, a succession of pictures are displayed by spatial light modulator 22 for each frame. Simultaneous to the display of a picture, spots 33 and 35 of light are alternately displayed on screen 26 of two dimensional display device 24. The positions of spots 33 are so controlled that light 37 passes through spatial light modulator 22 only to eye 12. Similarly, the positions of spots 35 are so controlled that light 39 passes through spatial light modulator 22 only to eye 14. As with the embodiment of FIG. 1, repetition of the display of each view must be repeated sufficiently quickly for the intervening dark periods not to be noticed by the human eye.

FIG. 2 also shows an alternative to video camera 40 as a tracking device: two infrared rangefinders 42 and 44 that are used to measure distances to the head of user 10 by measuring the round trip travel times of infrared pulses directed at the head of user 10. The position of the head of user 10 is inferred by triangulation, and the positions of the eyes of user 10 are inferred from the position of the head of user 10. Generally, any appropriate number of infrared beam devices, or electromagnetic and acoustic beam devices generally, as well as rangefinding devices generally, may be used as tracking devices within the scope of the present invention.

While the invention has been described with respect to a limited number of embodiments, it will be appreciated that many variations, modifications and other applications of the invention may be made.

What is claimed is:

1. An apparatus for displaying, to the eyes in the face of a single viewer, each of the eyes having a position, a subject in a motion picture having a plurality of frames, the apparatus comprising:

(a) a projector for projecting two different views of the subject, from two different angles, each of said views being projected at a different eye of the viewer;

(b) a tracking mechanism for tracking the positions of the eyes of the viewer; and (c) a control system coupled to and controlling said projector, and coupled to and controlling said tracking mechanism, for causing said projector to select and project said views in accordance with the positions of the eyes of the viewer.

2. The apparatus of claim 1, wherein said tracking mechanism includes a rangefinder.

3. The apparatus of claim 1 wherein said control system is operative to predict future positions of the eyes of the viewer.

4. The apparatus of claim 1, wherein said tracking mechanism includes a video camera that provides said control system with successive tracking images of at least part of the face of the viewer.

5. The apparatus of claim 4, wherein said control system uses a pattern recognition algorithm to recognize the eyes of the viewer in said tracking images.

6. The apparatus of claim 1, wherein said tracking mechanism includes a beam device.

7. The apparatus of claim 6, wherein said beam device is an acoustic beam device.

8. The apparatus of claim 6, wherein said beam device is an electromagnetic beam device.

9. The apparatus of claim 8, wherein said electromagnetic beam device is an infrared beam device.

10. The apparatus of claim 1, wherein said projector includes:

(i) a back-lighting mechanism for projecting a beam of light in selected directions; and (ii) a spatial light modulator for displaying frame images, said back-lighting mechanism acting as a back-light for said spatial light modulator;

and wherein said control system is operative to cause two different frame images of said subject to be formed in succession on said spatial light modulator, each different frame image corresponding to one of said views of said subject, each different frame image being formed one at a time on said spatial light modulator, with said two frame images constituting a single frame of the motion picture, and the direction of said beam of light being different for each of said two different frame images in accordance with the positions of the eyes of the viewer.

11. The apparatus of claim 10 wherein said spatial light modulator is a liquid crystal display.

12. The apparatus of claim 10 wherein said spatial light modulator is operative to adjust said frame images in accordance with an elevation of the eyes of the viewer, as determined by said control system.

13. The apparatus of claim 10 wherein said back-lighting mechanism includes:

A) a two dimensional display device for emitting spots or lines of light at selected locations of said two dimensional display device; and B) a lens system which comprises a plurality of lenses in a lenticular array;

and said control system controls said two dimensional display to emit light from a plurality of spots or lines corresponding to the respective lens of said lenticular array such that a corresponding plurality of beams of light emerge from said lenticular array in a substantially common direction for each frame image provided on said spatial light modulator.

14. The apparatus of claim 13, wherein said spatial light modulator is a liquid crystal display.

15. The apparatus of claim 10 wherein said back-lighting means includes:

A) a two dimensional display device for emitting a spot or a vertical line of light at selected locations of said two dimensional display device; and B) a lens system for refracting light emitted by said two dimensional display device to form said beam of light which is projected in selected directions, wherein the direction in which said beam of light is projected is dependent on the selected location of said spot or vertical line of light.

16. The apparatus of claim 15 wherein said spatial light modulator is a liquid crystal display.

17. The apparatus of claim 15, wherein said two dimensional display device emits spots or lines of red, blue, and green light at different times from substantially identical locations.

18. The apparatus of claim 15 wherein said two dimensional display device emits spots or lines of white light, and said spatial light modulator further comprised a plurality of colored filters.

* * * * *